(12) United States Patent
Samineni (10) Patent No.: US 9,785,765 B2
(45) Date of Patent: Oct. 10, 2017

(54) SYSTEMS AND METHODS FOR DIFFERENTIAL ACCESS CONTROL BASED ON SECRETS

(71) Applicant: Microsoft Technology Licensing, LLC., Redmond, WA (US)

(72) Inventor: Naga Rohit Samineni, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 16 days.

(21) Appl. No.: 14/540,491

(22) Filed: Nov. 13, 2014

(65) Prior Publication Data
US 2016/0140333 A1 May 19, 2016

(51) Int. Cl.
*G06F 21/36* (2013.01)
*G06F 3/0484* (2013.01)
*G06F 21/40* (2013.01)
*H04L 29/06* (2006.01)

(52) U.S. Cl.
CPC ......... *G06F 21/36* (2013.01); *G06F 3/04842* (2013.01); *G06F 21/40* (2013.01); *H04L 63/08* (2013.01); *H04L 63/0861* (2013.01); *H04L 2463/082* (2013.01)

(58) Field of Classification Search
CPC ............. G06F 21/31; H04L 2463/082; H04L 63/0861
See application file for complete search history.

(56) References Cited

U.S. PATENT DOCUMENTS

| 7,096,496 | B1 * | 8/2006 | Challener | G06F 21/31 713/100 |
| 7,295,098 | B2 * | 11/2007 | Betts, Jr. | B60R 25/04 307/9.1 |
| 7,552,467 | B2 * | 6/2009 | Lindsay | G06F 21/31 713/165 |
| 7,617,530 | B2 * | 11/2009 | Ruzyski | G06F 21/6218 713/182 |
| 7,810,143 | B2 * | 10/2010 | Ruzyski | G06F 9/4443 380/277 |
| 7,865,950 | B2 |  1/2011 | Lipetz | |

(Continued)

OTHER PUBLICATIONS

Harn, et al., "Integration of User Authentication and Access Control", In IEEE Proceedings on Computers and Digital Techniques, vol. 139, Issue 2, Mar. 1992, 5 pages.

*Primary Examiner* — James Turchen
(74) *Attorney, Agent, or Firm* — Liang IP, PLLC (57) ABSTRACT

Differential access to data for a user of a processor-based system is disclosed wherein the user may select one secret from among a plurality of secrets that allows and/or enables access to potentially different sets of data, different resources for accessing the data and/or different tasks for the user to interact with the system. The selection of any particular secret may arise as to the user's feeling as to how secure the environment is for accessing the data. For example, if the user is in a very secure environment, the user may select a secret that allows substantially broad access to data, resources and tasks. If the environment is not secure, or if the user is under duress, the user may select a secret that provides limited access, or a decoy set of data and/or may provide the user with access to defensive measures to protect the data.

19 Claims, 5 Drawing Sheets

(56) References Cited

U.S. PATENT DOCUMENTS

| | | | |
|---|---|---|---|
| 7,941,848 B2* | 5/2011 | Yadav | G06F 21/6218 713/182 |
| 7,945,951 B2* | 5/2011 | Yadav | G06F 9/45512 713/182 |
| 7,996,885 B2 | 8/2011 | Jaiswal et al. | |
| 8,381,279 B2 | 2/2013 | Michener et al. | |
| 8,424,079 B2* | 4/2013 | Adams | G06F 21/32 713/168 |
| 8,549,591 B2 | 10/2013 | Vidal | |
| 9,213,814 B2* | 12/2015 | Grigg | G06F 21/31 |
| 9,262,642 B1* | 2/2016 | Roth | G06F 21/62 |
| 9,264,419 B1* | 2/2016 | Johansson | H04L 63/08 |
| 2002/0112183 A1* | 8/2002 | Baird, III | H04L 63/083 726/9 |
| 2004/0220996 A1* | 11/2004 | Huang | H04L 63/02 709/201 |
| 2006/0075230 A1* | 4/2006 | Baird, III | H04L 63/083 713/168 |
| 2006/0242427 A1* | 10/2006 | Ruzyski | G06F 9/4443 713/186 |
| 2007/0083770 A1* | 4/2007 | Heasman | G06F 21/52 713/190 |
| 2007/0261112 A1* | 11/2007 | Todd | G06F 21/577 726/11 |
| 2008/0319905 A1* | 12/2008 | Carlson | G06Q 20/04 705/44 |
| 2009/0293119 A1* | 11/2009 | Jonsson | G06F 21/36 726/19 |
| 2009/0300532 A1* | 12/2009 | Cowan | G06F 21/53 715/771 |
| 2010/0192209 A1* | 7/2010 | Steeves | G06F 21/316 726/7 |
| 2012/0054875 A1* | 3/2012 | Antill | G06F 21/10 726/28 |
| 2013/0144785 A1* | 6/2013 | Karpenko | G06Q 20/409 705/44 |
| 2013/0151853 A1* | 6/2013 | Azzouz | H04L 9/08 713/171 |
| 2015/0089585 A1* | 3/2015 | Novack | H04L 63/08 726/3 |
| 2015/0222604 A1* | 8/2015 | Ylonen | H04L 63/062 713/171 |
| 2015/0281210 A1* | 10/2015 | Weisberger | H04L 63/1491 726/28 |

\* cited by examiner

FIG.5

SYSTEMS AND METHODS FOR DIFFERENTIAL ACCESS CONTROL BASED ON SECRETS

BACKGROUND

Current access control mechanisms for a resource or a service using one factor authentication tend to have a vulnerability that, once the secret is known to an attacker (perhaps when entered through an un-trusted or bugged device), the attacker may be able to gain access to the service or resource with the complete privileges as that of the user.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

In one embodiment, a processor-based system for allowing the user to select a view, said view comprising a set of data, a set of resources, said resources interacting with said data and a set of tasks, said tasks interacting with said processor-based system, the processor-based system comprising: a processor; a computer readable storage media, said computer-readable storage media configured to store computer-readable instructions; said processing in communications with a database, said database comprising data associated with a user; said processor providing a user interface, said user interface accepting input from a user, the input comprising at least one indicia of the user's identity and a first input secret; wherein the first input secret is selectable by the user among a plurality of input secrets; and wherein further each input secret is associated with an associated view.

In another embodiment, a processor-implemented method for allowing a user differential access to data within one of a set of views, each said view comprising a set of associated data, a set of associated resources interacting with said data and a set of associated tasks, said tasks allowing the user to interact with a processor-based system, the method comprising: presenting the user with an interface; accepting at least one indicia of the user's identity; accepting at least one secret, said one secret being one of a plurality of secrets selectable by the user, and said one secret associated with said user's indicia; authenticating said user, based upon said at least one indicia and said at least one secret; and presenting the user with a view, the view associated with said at least one secret.

In yet another embodiment, a processor-implemented method for allowing escalation of a user's first view to a second view, where each said view comprising a set of associated data, a set of associated resources interacting with said data and a set of associated tasks, said tasks allowing the user to interact with a processor-based system; the method comprising: while the user has been authenticated for access to data via a first view during a session, said first view associated with a first secret, allowing the user to request an escalation to a second view; and accepting a second secret, said second secret associated with a second view.

Other features and aspects of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

In many embodiments of the present application, several computer systems and/or methods are disclosed herein where one or more users may access data and/or services in a differential and/or alternative manner, enabling different user states/views, as desired by the user. In one case, the system/method may select states/views depending on the environment the user operates. In one case, it may be desired to provide a good degree of security—e.g., in case of an insecure environment. It may also be desirable to minimizing the losses—e.g., if the access secret is exposed by some means like line tapping or device bugging or eavesdropping et cetera.

Figure 1:
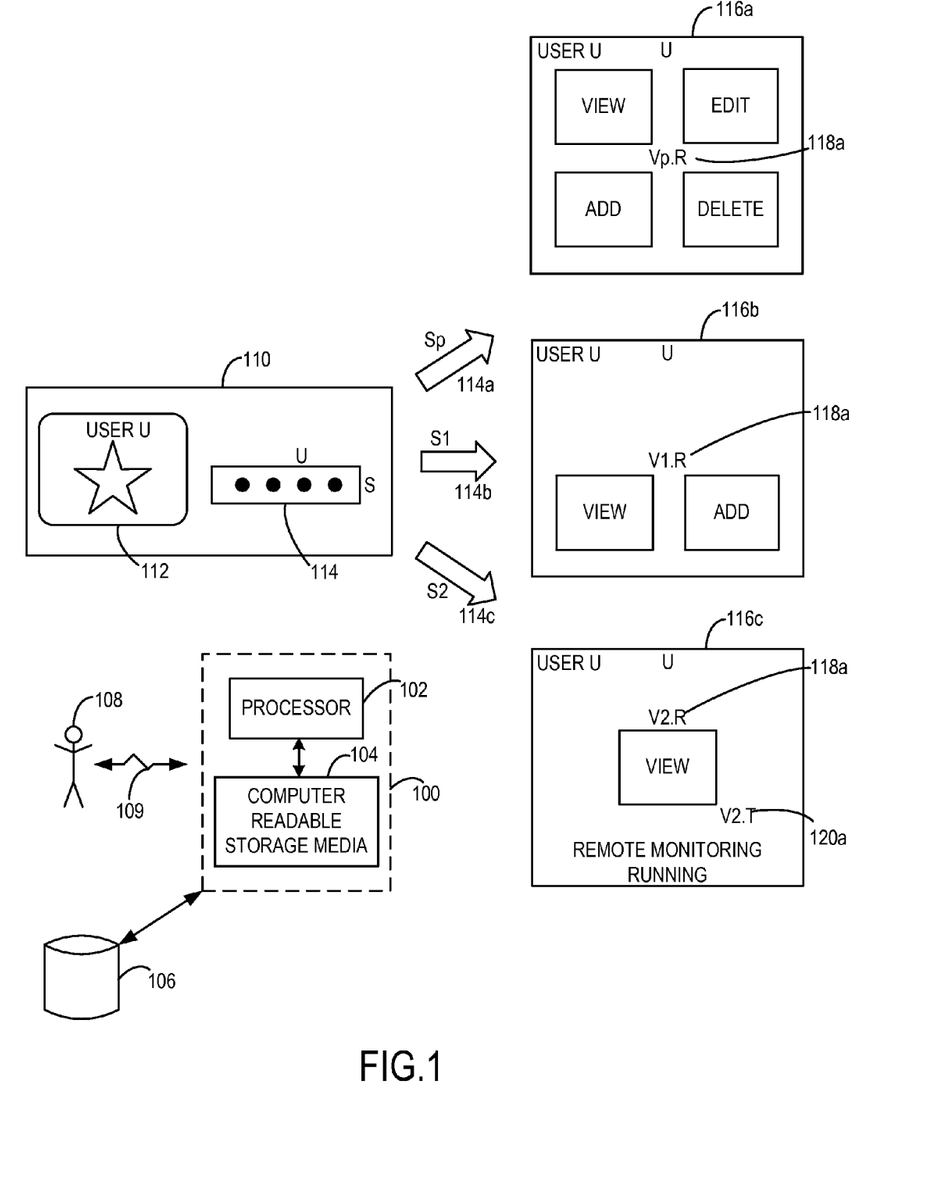
FIG. 1 depicts one embodiment of an exemplary system and/or method of a differential and/or alternative computing states and/or views as made in accordance with the principles of the present application.

FIG. 1 is one embodiment of a system and/or method as made in accordance with the principles of the present application. System 100 may comprise one or more processor 102 that are in communications with one or more computer readable storage media 104.

Such computer storage media may include removable and/or non-removable media implemented in any method or technology for storage of information, such as computer-readable instructions, data structures, program modules, or other data. Computer storage media may include, but is not limited to, random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device. Such media may be capable of storing computer-readable, processor-executable program instructions as computer program code that can be executed by the processor as a particular machine configured for carrying out the operations and functions described in the implementations herein.

In contrast, communication media may embody computer-readable instructions, data structures, program modules, or other data in a modulated data signal, such as a carrier wave. As defined herein, computer storage media does not include communication media.

Processor 102 may also be in communications with database and/or additional storage media 106. Database 106 (and/or media 104) may store additional data and/or services to which user 108 may have access—and to which security is desired by user 108. This database may be implemented in a number of suitable manners—for example, it may be implemented as a server connected by a network (e.g., the internet) or, it may be substantially co-located with the system 100 itself.

As mentioned previously, it will be appreciated that system 100 may be implemented in a number of suitable manners. For merely one example, system 100 may be remote to user 108 and connection/communication 109 with user 108 may be remote as well (e.g., via the internet or some networked connection). In another example, system 100 may be substantial proximity to user 108—e.g., as an Automatic Teller Machine (ATM) or a Point of Sale (POS) machine or the like. Other processor-based systems are, of course, possible and in the scope of the present application—such as, e.g., an email system, an ATM system, a file server, a server system and a database. Processor(s) 102 may be co-located, or distributed, as may be desired depending on the architecture of the system.

User interface (and/or user state) 110 depicts the state of the user's interaction with system 100. User interface/state 110 may be actual (e.g., a display screen, keyboard, card reader or the like) or may be virtual and/or abstract (e.g., depicting the state/status of user access and/or privileges).

User interface/state 110 may comprise at least one indicia 112 of a user's identity. Suitable indicia 112 might comprise (but not limited to): a user name, a user account number/name, a biometric data, a magnetic stripe card, an electronic device/card or the like—e.g., some data that maps and/or keys into a user's identity. User interface/state 110 may also include a user's secret 114 (denoted as $S_i$).

User's secret 114 may comprise data that may serve one or more actions and/or functions. For example, a user's secret may comprise (but not limited to): a password, a key, a hash, a data or the like. As will be explained further herein, a user may have a plurality of secrets, ($S_p$, $S_1$, $S_2$ as 114a, 114b, and 114c, respectively) wherein each such secret may enable, launch or otherwise activate a set of user states and/or views (e.g., state/view 116a, state/view 116b, state/view 116c, respectively). For each of these states/views, there may be certain associated resources (e.g., 118a) and tasks (e.g. 120a). In another embodiment, the user's secret may be a blank and/or null input, as another possible input secret. There may be many ways to input a null input (e.g., hitting Enter without input a code or the like).

For merely one paradigm example, the embodiment of FIG. 1 may represent several potential views of a database to which the user has access. The database may comprise objects (e.g., files) for which the resources (such as "View", "Edit", "Add" and/or "Delete") may have meaning and/or functionality. As shown, the user has three possible states and/or connections to the database via the three secrets ($S_p$, $S_1$, $S_2$) as depicted. The user may deliberately select which secret to enter (and/or engage with) into user interface 110.

As also seen, the selection of a given secret gives the user a potentially unique experience with the database itself. In several paradigm uses of the systems and/or methods of the present application, this may be desired from a standpoint of—e.g., security. For merely one example, if the user is accessing his data and/or files in a relatively (or substantially) insecure environment (e.g., there are other people around who might spy and/or access the user's data and/or files surreptitiously), then the user might opt for choosing a secret that gives a subset of resources and/or tasks that the user feels comfortable in enabling and/or actuating in that environment.

Continuing with the example of FIG. 1, if user selects Sp, then state/view 116a is available; if user selects S1, then state/view 116b is available and if the user selects S2, then state/view 116c is available. It may be seen that different sets of resources are available (e.g., Vp.R, V1.R and V2.R). In one sense, resources may be actions, functions, actuations that the user may perform on the data in question. The user may also have different tasks (e.g., V2.T) for each state/view. A resource may also mean the data in itself that may also be available over a hash function (or the like) on U and Si, denoted by H(U,S).

In one sense, tasks may be actions, functions, actuations that the user may perform on the user's available resources and/or interactions with the data. For merely one example, one of user's tasks might be to dynamically allow and/or enable an escalation of the user's view and/or level of interaction with the data (e.g., to allow a greater set of resources and/or functions that may be applied to the data). This escalation may be dynamically selected by the user (e.g., if the environment conditions change—say, from less secure to more secure, or vice versa). In another example, one of user's tasks might be to delete and/or invalidate the current Si for the user U, giving rise to a possibility of having passwords that expire after a certain possibly customizable time.

Figure 2:
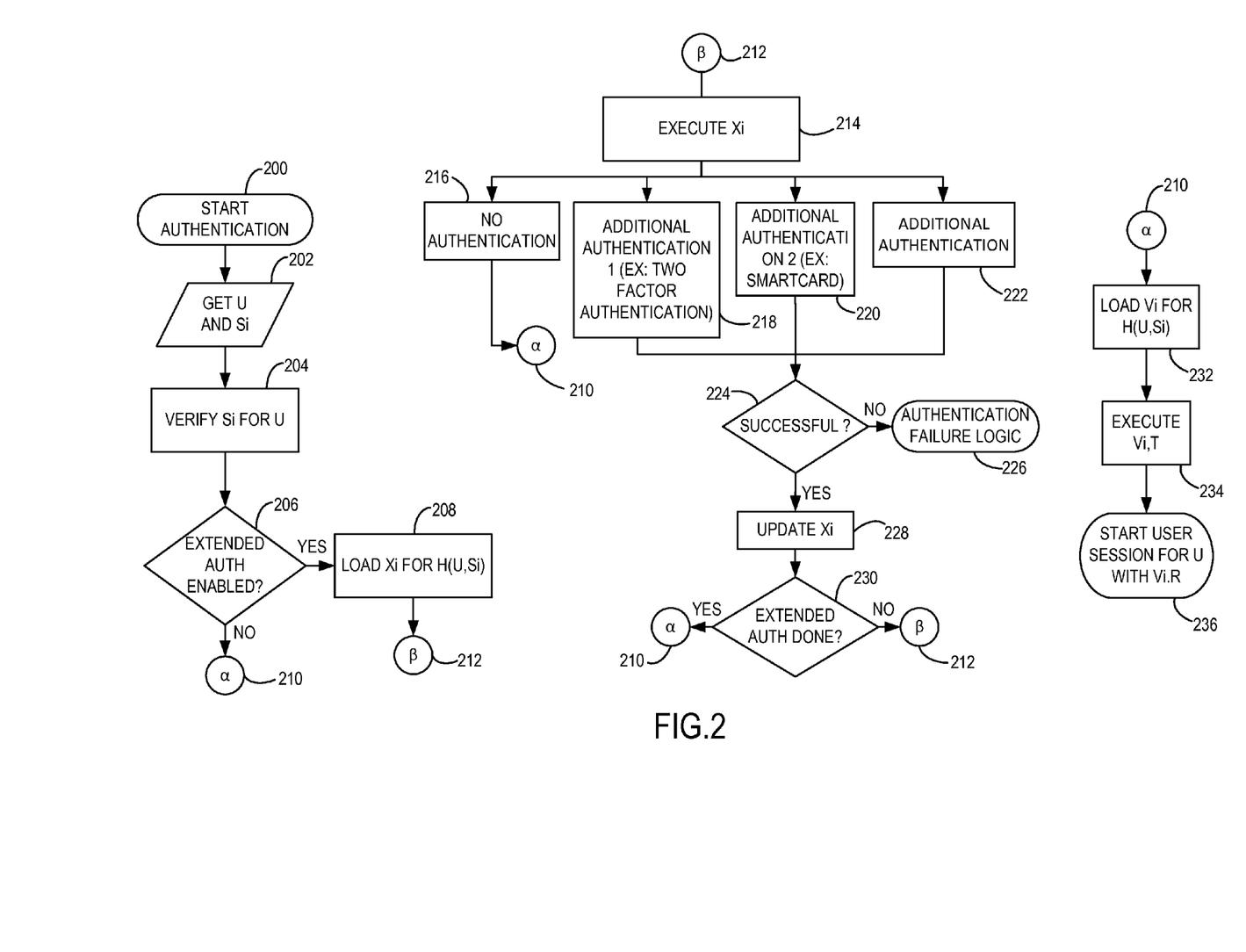
FIG. 2 depicts one embodiment of a system/method for starting the authentication process that enables a user to dynamically select a user state/view as desired.

In reference to FIG. 2, there is depicted one embodiment of a flowchart/algorithm/method for commencing user interaction with the present systems and/or methods. User may start authentication at 200. From there, user may input a user indicia (U) and possibly one of the secrets (Si) at 202. The system may verify that Si matches with U at 204. It will be appreciated that the system may have a number of secrets associated with a particular user—and that authentication may also impact the amount and/or number of resources and tasks available—as well as possibly the amount or quality of data presented and/or accessible to the user.

The system at 206 may inquire as to whether extended authorizations are enabled. In one embodiment, an extended authentication profile (e.g., $X_i$) may be a data structure, a list, etc. that may correspond to a specific H(U, Si) (or may be system specific) indicating additional authentications. When enabled, the additional authentications may be employed in order to grant the view Vi associated with H(U, Si) to the user. An extended authentication profile, $X_i$, may also dictate the codes in which the user is challenged with the additional authentications. It is also to be appreciated that Xi may be dynamically generated and/or modified (e.g., dynamic creation of a time limited secret—e.g., a secret that may be invalidated, expired and/or removed after a certain time, or that mandates a 2 factor authentication to succeed authentication).

Such extended authorizations (and/or escalations) may be possible and/or desired if the user would like to access more resources, tasks and/or data dynamically over a session, or over time. If there are no extended authorizations enabled at this point, the system/method may transition to 210. Otherwise, extended authorizations are enabled and the system/method may load Xi for a given user U and a secret Si. These Xi's may be identified and/or computed by performing a hash function (or the like) on U and Si. Afterwards, the system/method may transition to 212.

In the case of extended authorizations enabled, the system/method may execute additional authorization routines/methods ($X_i$) at 214. From there, the system/method may select (e.g., according to user input, preference, or automatic preference) among a set of additional authorizations (e.g., no authentications (216), additional authentication 1 (218), additional authentication 2 (220), or any other additional authentication (222)).

It will be appreciated that there may be less additional authorization, or more additional authorization, as desired. Each additional authorization may be based on different routines and/or indicia to be utilized and/or displayed to/by the user. For example, one addition authorization may involve a two-factor authentication (e.g., sending a PIN to the user's cell phone or another device—or may involve the scanning of a smart card, or the like).

If there is no authentication at 216, then the system/method may proceed to 210. Otherwise, the system/method may query at 224 as to whether the additional authentications were successful or not. If not, then the system/method may affect some desired authentication failure routine and/or logic at 226. Otherwise, the additional authentication was successful, and the Xi is updated at 228. In step 228, on a current extended authentication being successful, Xi may be updated—e.g., in memory for the session associated with 200—and it may be remembered that one of the possibly plural extended (e.g., additional) authentications was successful. At 230, the system/method may query whether the process/method of extended authorization is complete and/or done. In one embodiment, at step 230, an algorithm may be run on Xi to check if all the authentication conditions (e.g., as set forth by the extended authentication profile Xi) are accomplished—or, if any authentication conditions are pending. If yes, the system/method may transition to 210—otherwise, to 212.

At 210, the system/method may load the state/view (Vi) at 232—and present to user for viewing/action or the like. This may be accomplished in any number of suitable ways—e.g., including loading Vi according to a hash function H(U, Si). It will be appreciated that this hash function may be the same, similar or different from the hash performed at 208. In addition, it should be appreciated that other ways of calculating and/or identifying a state/view are possible.

At 234, the system/method may execute and/or otherwise enable/present the set of tasks for user (e.g., Vi.T). The user session may then begin at 236 for user U with a set of resources Vi.R, a possible set of task Vi.T and upon a desired set of data.

In one embodiment, the extended authentication profile may choose to discard the authentication accomplishments by the user so far—e.g., after the process of extended authentications completes. In another embodiment, the profile may choose to save the same for a temporary or permanent life time (e.g., depending on the application) in order to speed up any possible subsequent re-runs of respective authentication techniques.

For merely one example, if a user succeeds two factor authentication (e.g., by sending a PIN to a user's cell phone), but fails e.g., smart card authentication because of, e.g., an incorrectly entered PIN, or immediate re-run of authentication session (200) by user U for a same secret Si. The step 214 may choose to skip the 'two factor authentication by PIN to user's cell phone'—as it was just recently run and proceed directly to smart card based authentication.

Figure 3:
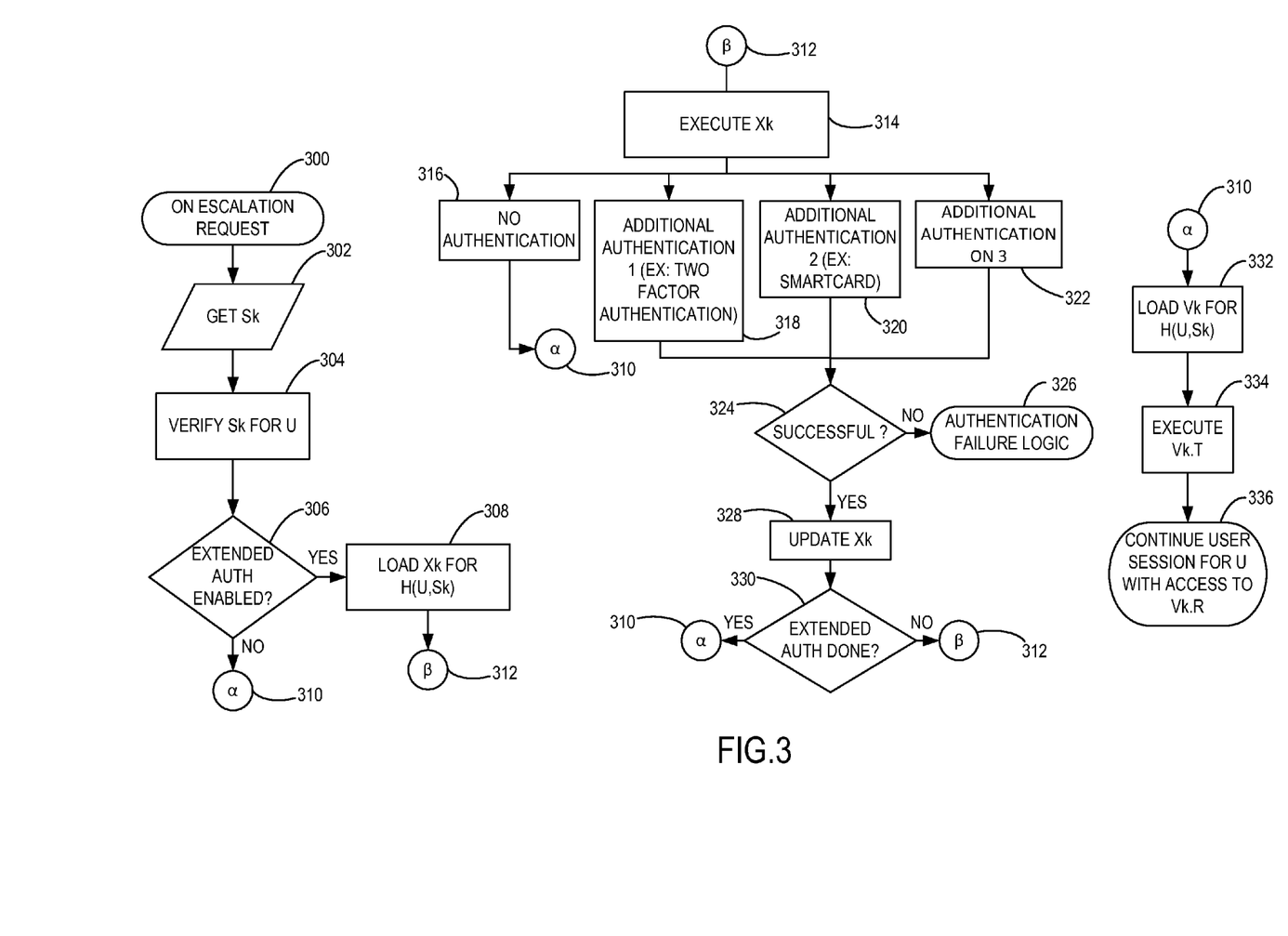
FIG. 3 depicts one embodiment of a system/method for processing an escalation request that enables a user to dynamically change a set of tasks, views or resources for a user as desired.

In reference to FIG. 3, it will now be disclosed one embodiment for the system/method to handle escalation requests from a user. As mentioned, escalation requests may be started, activated or otherwise initiated by the user—e.g., in response to the user's desire to access more/different data, more/different resources, and/or more/different tasks. These escalations may take place dynamically over time—e.g., perhaps during the course of a single session or multiple sessions.

The system/method of FIG. 3 for escalations may proceed in a somewhat similar fashion to the system/method for starting a user session with the system/method (as shown in FIG. 2).

User may start and/or initiate an escalation request at 300. From there, user may input one of the secrets (Sk) at 302. The system may verify that Sk matches with U at 304. In this case, it may also be possible for the system/method to require the user input some indicia U that is associated with the user. It will be appreciated that the system may have a number of secrets associated with a particular user—and that authentication may also impact the amount and/or number of resources and tasks available—as well as possibly the amount or quality of data presented and/or accessible to the user.

The system at 306 may inquire as to whether extended authorizations are enabled. If there are no extended authorizations enabled at this point, the system/method may transition to 310. Otherwise, extended authorizations are enabled and the system/method may load Xk for a given user U and a secret Sk. These Xk's may be identified and/or computed by performing a hash function (or the like) on U and Sk. Afterwards, the system/method may transition to 312.

In the case of extended authorizations enabled, the system/method may execute additional authorization routines/methods (Xk) at 314. From there, the system/method may select (e.g., according to user input, preference, or automatic preference) among a set of additional authorizations (e.g., no authentications (316), additional authentication 1 (318), additional authentication 2 (320), or any other additional authentication (322)).

It will be appreciated that there may be less additional authorization, or more additional authorization, as desired. Each additional authorization may be based on different routines and/or indicia to be utilized and/or displayed to/by the user. For example, one addition authorization may involve a two-factor authentication (e.g., sending a PIN to the user's cell phone or another device—or may involve the scanning of a smart card, or the like).

If there is no authentication at 316, then the system/method may proceed to 310. Otherwise, the system/method may query at 324 as to whether the additional authentications were successful or not. If not, then the system/method may affect some desired authentication failure routine and/or logic at 326. Otherwise, the additional authentication was successful, and the Xk is updated at 328. At 330, the system/method may query whether the process/method of extended authorization is complete and/or done. If yes, the system/method may transition to 310—otherwise, to 312.

At 310, the system/method may load the state/view (Vk) at 332—and present to user for viewing/action or the like. This may be accomplished in any number of suitable ways—e.g., including loading Vi according to a hash function H(U, Sk). It will be appreciated that this hash function may be the same, similar or different from the hash performed at 308. In addition, it should be appreciated that other ways of calculating and/or identifying a state/view are possible.

At 334, the system/method may execute and/or otherwise enable/present the set of tasks for user (e.g., Vk.T). The user session may then continue at 336 for user U with access to more/different set of resources Vk.R, a possible set of task Vk.T and upon a desired set of data.

Email Paradigm Example

It will now be disclosed one exemplary embodiment for the systems/methods of the present application in the context of an email system.

Figure 4:
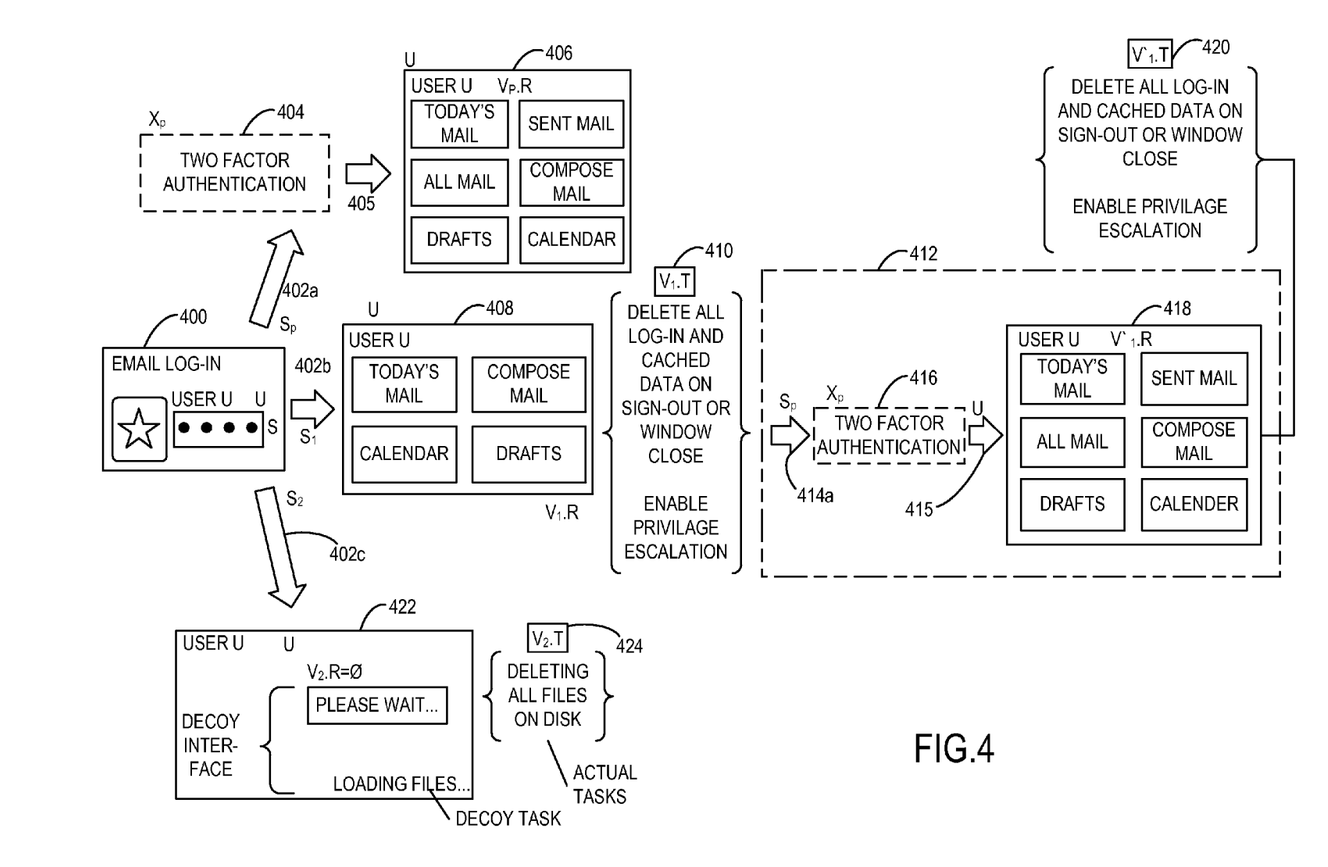
FIG. 4 depicts one paradigm example of an email system that enables a differential and/or alternative computing states and/or views for a user as desired.

As may be seen, the user interface/state 400 may allow and/or enable the input of at least one of many secrets (e.g., Sp, S1, S2—as 402a, 402b, 402c, respectively)—that may ultimately initiated a number of states/views. If Sp is entered, it is possible that Sp may enable and/or initiate a two-factor authentication process. This may be desirable if Sp enables a fuller and/or more sensitive set of resources, tasks or accessible data than other secrets. If the two-factor authentication is successful at 405, then the user U may be presented with state/view 406.

If another secret (e.g., S1) is entered and/or inputted, then a first state/view 408 is presented to the user. State/view 408 may have associated with it resources V1.T and tasks V1.T (410). As may be seen, tasks V1.T (410) may have several tasks and/or routines associated. For example, user may delete all log-in and cached data on sign-out and/or window closing. In addition, the user may have an escalation privilege.

At 412, it is demonstrated how such an escalation may occur. A new secret, Sp, may be input at 414a—which may in turn invoke/start an two-factor authentication process (similar to 404) at 416. If successful at 415, the user may be presented with more/different resources 418 (V'1.R)—as well as more/different tasks 420 (V'1.T).

If secret 402c is input, this may be the case in which the user is in a very insecure environment (or, worse, under a state of duress and/or threat). In such a case, the user may be presented with a user state/view 422 that may serve as a decoy interface (as depicted in FIG. 4)—e.g., possibly with V2.R being the null set of resources and/or files. In addition, one or several of the available tasks—V2.T (424)—may be tasks that allow/enable the user to take some measure of defensive action (e.g., deleting all files or the like).

ATM/Card Reader Paradigm Example

It will now be disclosed one exemplary embodiment for the systems/methods of the present application in the context of an ATM and/or some card reader system.

Figure 5:
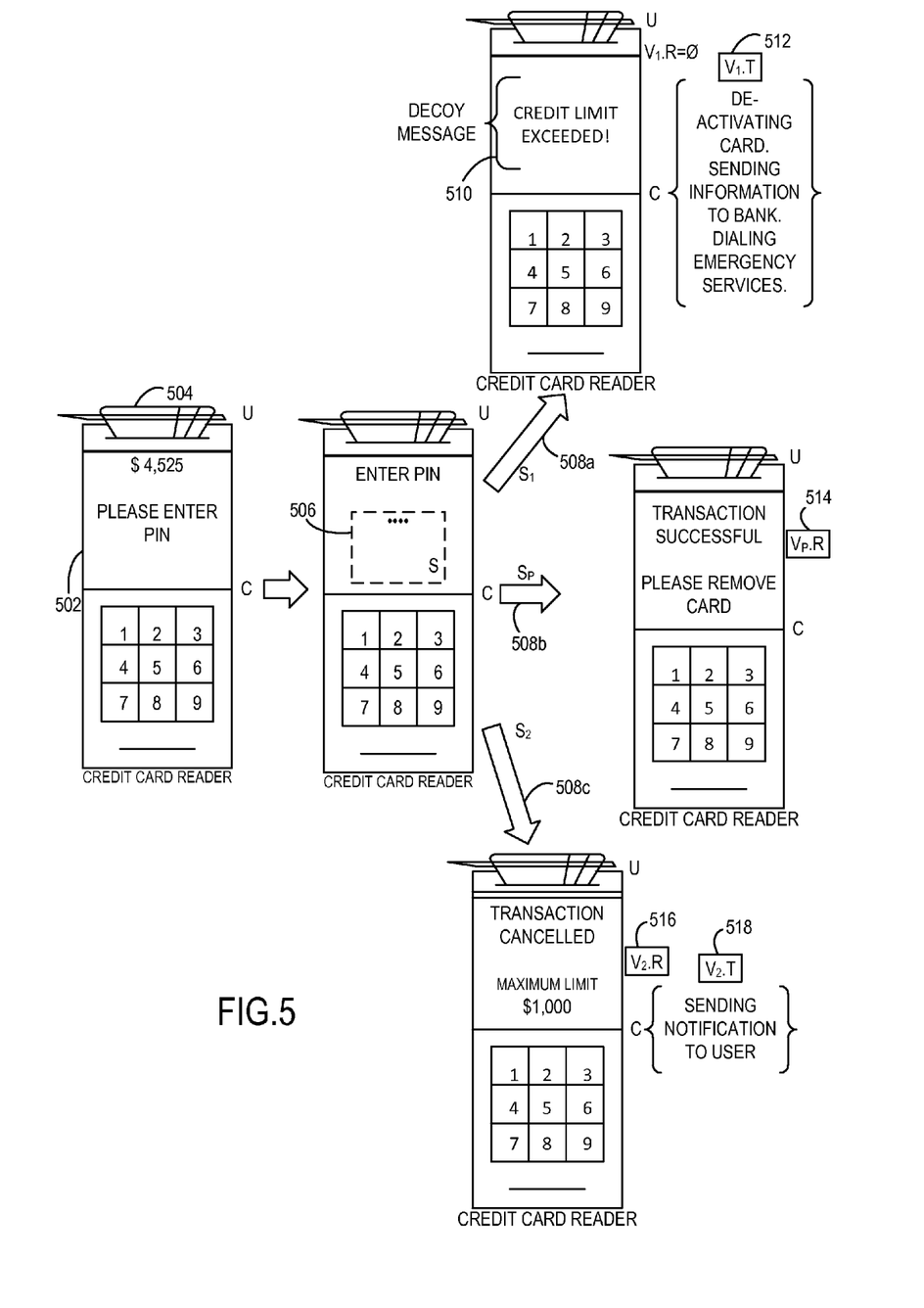
FIG. 5 depicts one paradigm example of an ATM/card reader system that enables a differential and/or alternative computing states and/or views for a user as desired.

As depicted in FIG. 5, there is an ATM machine or some form of card reading machine that provides the user with an interface to a set of resources, tasks and data. User may input a magnetic stripe card 504 that is associated with the user U. Once inserted, the system/method may prompt the user to input a PIN—wherein the user may input a secret 506.

Again, depending upon the environment that the user feels exists, there may be a number of different secrets that the user may input. For example, if the user feels being in a very insecure environment (or, at worse, under duress or threat), the user may input S1 (508a)—which may present a decoy message and allow access to no resources. In addition, allowable tasks may include defensive measures—e.g., de-activating the card, sending information to the bank, alerting police or other emergency services or the like. It should be appreciated that other decoy messages may be possible—e.g., to withdraw some money to make it seem that all is normal (but that a limit is placed on the account for withdrawal)—this make give time for emergency services to respond without unduly alerting persons placing the user under duress.

In another case, the user may input Sp (508b) and all maximally available resources and/or tasks (514) are made available to the user. In yet another case, the user may input S2 (508c) and a different set of resources and/or tasks may be made accessible to the user.

The following are merely examples given herein.

Example 1

A processor-based system for allowing the user to select a view, said view comprising a set of data, a set of resources, said resources interacting with said data and a set of tasks, said tasks interacting with said processor-based system, the processor-based system comprising: a processor; a computer readable storage media, said computer-readable storage media configured to store computer-readable instructions; said processing in communications with a database, said database comprising data associated with a user; said processor providing a user interface, said user interface accepting input from a user, the input comprising at least one indicia of the user's identity and a first input secret; wherein the first input secret is selectable by the user among a plurality of input secrets; and wherein further each input secret is associated with an associated view.

Example 2

The system of the preceding Example 1 wherein said plurality of input secrets is selectable by the user according to the user's perception of the security of the environment in which the user is accessing the view.

Example 3

The system of any preceding Examples 1 through 2 wherein at least one input secret selectable by the user allows the user to access sensitive data and a substantially complete set of resources for interacting with said data.

Example 4

The system of any preceding Examples 1 through 3 wherein at least one input secret selectable by the user renders a decoy message in user's view.

Example 5

The system of any preceding Examples 1 through 4 wherein at least one input secret selectable by the user allows the user to perform defensive measures to protect said data.

Example 6

The system of any preceding Examples 1 through 5 wherein said input secret selectable by the user is selected by the user when the user is in situation of duress.

Example 7

The system of any preceding Examples 1 through 6 wherein said processor-based system is one of a group, said group comprising: an email system, an Automatic Teller Machine (ATM) system, a file server, a server system and a database.

Example 8

The system of any preceding Examples 1 through 7 wherein one of said tasks associated with at least one input secret allows the user to dynamically escalate the user's view.

Example 9

The system of any preceding Examples 1 through 8 wherein said processor-based system further comprises a two-factor authentication process for enabling at least one view for the user.

Example 10

A processor-implemented method for allowing a user differential access to data within one of a set of views, each said view comprising a set of associated data, a set of associated resources interacting with said data and a set of associated tasks, said tasks allowing the user to interact with a processor-based system, the method comprising: presenting the user with an interface; accepting at least one indicia of the user's identity; accepting at least one secret, said one secret being one of a plurality of secrets selectable by the user, and said one secret associated with said user's indicia; authenticating said user, based upon said at least on indicia and said at least one secret; and presenting the user with a view, the view associated with said at least one secret.

Example 11

The method of the preceding Example 10 wherein said interface comprises one of a group, said group comprising: a display, a keyboard and a card reader.

Example 12

The method of any preceding Examples 10 through 11 wherein said at least one indicia comprises one of a group, said group comprising: a user name, a user account number, biometric data, a magnetic stripe card and an electronic device.

Example 13

The method of any preceding Examples 10 through 12 wherein said plurality of secrets comprises one of a group, said group comprising: a secret for when the user is in a secure environment and a secret for when the user is in an insecure environment.

Example 14

The method of any preceding Examples 10 through 13 wherein said method further comprises: presenting the user with a decoy interface when the user selects a secret for when the user is in an insecure environment.

Example 15

The method of any preceding Examples 10 through 14 wherein said method further comprises: allowing the user to perform defensive measures to protect the data.

Example 16

The method of any preceding Examples 10 through 15 wherein said method further comprises: allowing the user to dynamically escalate the user's view during a single session.

Example 17

The method of any preceding Examples 10 through 16 wherein said method further comprises: initiating a two-factor authentication process with the user when presented with the input of at least one secret.

Example 18

The method of any preceding Examples 10 through 17 wherein said method implements one of a group, said group comprising: an email system, an Automatic Teller Machine (ATM) system, a file server, a server system and a database.

Example 19

A processor-implemented method for allowing escalation of a user's first view to a second view, where each said view comprising a set of associated data, a set of associated resources interacting with said data and a set of associated tasks, said tasks allowing the user to interact with a processor-based system; the method comprising: while the user has been authenticated for access to data via a first view during a session, said first view associated with a first secret, allowing the user to request an escalation to a second view; and accepting a second secret, said second secret associated with a second view.

Example 20

The method of the preceding Example 19 wherein said method further comprising: initiating a two-factor authentication process for allowing access to said second view.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

The invention claimed is:

1. A processor-implemented method for allowing a user differential access to data within one of a set of views, each the view comprising a set of associated data, a set of associated resources interacting with the data and a set of associated tasks, the tasks allowing the user to interact with a processor-based system, the method comprising:
presenting the user with an interface with a first input field of an indicia of a user's identity and a second field of a user secret, the second field using one of a plurality of secret values selectable by the user as an input value of the user secret, wherein the plurality of secret values including first and second secret values that are both valid authentication secret values of a single type in connection with the indicia of the user's identity;
accepting, from the user, the indicia of the user's identity from the first field and a secret value from the second field;
in response to accepting the indicia of the user's identity and the secret value, authenticating the user, based upon a combination of the accepted indicia of the user's identity and the secret value;
upon authentication based upon the combination of the accepted indicia of the user's identity and the secret value,
determining whether the accepted secret value is the first or second secret value;
in response to determining that the accepted secret value is the first secret value, initiating an additional authentication process for the user and upon successful completion of the initiated additional authentication process by the user, determining a first view comprising access to a first subset of data on the computing system;
in response to determining that the received secret value is the second secret value, determining a second view comprising access to a second subset of the data on the computing system, the second subset of the data being different than the first subset of the data; and
presenting the user with one of the first or second view corresponding to the accepted secret value being the first or second secret value, respectively.

2. The method of claim 1 wherein the interface comprises one of a display, a keyboard, or a card reader.

3. The method of claim 1 wherein the accepted indicia comprises one of a user name, a user account number, biometric data, a magnetic stripe card, or an electronic device.

4. The method of claim 1 wherein the first secret value is a secret value for when the user is in a secure environment and the second secret value is a secret value for when the user is in an insecure environment.

5. The method of claim 1 wherein:
the first secret value is a secret value for when the user is in an insecure environment; and
presenting the user includes presenting the user with a decoy interface when the accepted secret is the first secret value and the initiated additional authentication process has failed.

6. The method of claim 5 wherein the method further comprises:
in response to determining that the accepted secret value is the first secret value and the initiated additional authentication process has failed, allowing the user to perform defensive measures to protect the first subset of data on the computing device.

7. The method of claim 1 wherein the method further comprises:
allowing the user to dynamically escalate the user's view during a single session.

8. The method of claim 1 wherein the method further comprises:
initiating a two-factor authentication process with the user when presented with the input of the secret value.

9. The method of claim 1 wherein the method implements one of an email system, an Automatic Teller Machine (ATM) system, a file server, a server system, or a database.

10. A computing system, comprising:
a processor;
a display screen; and
a memory containing instructions executable by the processor to cause the processor to:
present, on the display screen, a user interface having a user indicia field and a user secret field using a character-based password as input;
receive, via the presented user interface, an input of a user indicia in the user indicia field and a secret in the user secret field;
in response to receiving the input of the user indicia and the secret, authenticate the user based upon a combination of the received input of the user indicia and the secret;
upon authentication based upon the combination of the received input of the user indicia and the secret,
determine whether the received secret is a first secret or a second secret different than the first secret, both the first and second secrets being valid authentication secrets of a single type corresponding to the received input of the user indicia;
in response to determining that the received secret is the first secret, initiating an additional authentication process for the user and upon successful completion of the initiated additional authentication process by the user, determine a first view corresponding to a first combination of the received input of the user indicia and the first secret, the first view comprising access to a first subset of data on the computing system;

in response to determining that the received secret is the second secret, determine a second view corresponding to a second combination of the same received input of the user indicia and the second secret, the second view comprising access to a second subset of the data on the computing system, wherein the second subset of the data is different than the first subset of the data; and present, on the display screen, the determined first or second view corresponding to the first combination of the received input of the user indicia and the first secret or the second combination of the received input of the user indicia and the second secret, respectively.

11. The computing system of claim 10 wherein the user indicia includes a user name, a user account number, or a set of user biometric data, and wherein the secret includes a password, a key, or a hash.

12. The computing system of claim 10 wherein the first and second view also include a first subset of resources and a second subset of resources allowing interaction with the data, the first subset of resources being different than the second subset of resources.

13. The computing system of claim 10 wherein the first and second view also include a first subset of tasks and a second subset of tasks performable on the data, the first subset of tasks being different than the second subset of tasks.

14. The computing system of claim 10 wherein:
to determine the first view includes to determine the first view according to a first value of a hash function with the user indicia and the first secret as input parameters;
to determine the second view includes to determine the second view according to a second value of the hash function with the user indicia and the second secret as input parameters; and
the first value is different than the second value.

15. A processor-implemented method for allowing a user differential access to a set of data on a computing system having a processor and a display screen, the method comprising:
presenting, on the display screen, a user interface having a user indicia field and a user secret field using a character-based password as input;
receiving, via the presented user interface, an input of user indicia in the user indicia field and another user input of a secret in the user secret field;
with the processor, authenticating the user based upon a combination of the received user indicia and the secret; and
upon authentication of the combination of the received user indicia and the secret,
determine whether the received secret is a first secret or a second secret different than the first secret, both the first and second secrets being valid authentication secrets of a single type corresponding to the received input of the user indicia;
in response to determining that the received secret is the first secret, initiating an additional two-factor authentication process for the user and upon successful completion of the initiated additional two-factor authentication process by the user, determine a first view corresponding to the first secret, the first view comprising access to a first subset of data on the computing system, a first set of resources allowing interaction with the first subset of the data, or a first set of tasks performable on the first subset of the data; and
in response to determining that the received secret is the second secret, determine a second view corresponding to the second secret, the second view comprising access to a second subset of the data on the computing system, wherein the second subset of the data is different than the first subset of the data, a second set of resources allowing interaction with the second subset of the data, or a second set of tasks performable on the second subset of the data; and
presenting, on the display screen, the determined first or second view uniquely corresponding to the combination of the received user indicia and the secret.

16. The processor-implemented method of claim 15 wherein the user indicia includes a user name, a user account number, or a set of user biometric data, and wherein the secret includes a password, a key, or a hash.

17. The processor-implemented method of claim 15 wherein:
the computing system includes a database that stores the set of data;
the database provides a set of database functions;
the first set of resources includes a first subset of the database functions; and
the second set of resources includes a second subset of the database functions different than the first subset of the database functions.

18. The processor-implemented method of claim 15 wherein:
the computing system includes a database that stores the set of data;
the database provides a set of database functions;
the first set of resources includes the set of the database functions; and
the second set of resources includes a subset of the database functions.

19. The processor-implemented method of claim 15 wherein determining the view includes determining the view according to a hash function with the user indicia and the secret as input parameters.

* * * * *